United States Patent [19]

Koch et al.

[11] Patent Number: 4,669,846
[45] Date of Patent: Jun. 2, 1987

[54] COUPLING DEVICE FOR FRAME-SHAPED ACCESSORIES FOR CAMERA EQUIPMENT

[75] Inventors: Hans-Carl Koch, Flurlingen; Peter Dätwyler, Diessenhofen, both of Switzerland

[73] Assignee: Sinar AG Schaffhausen, Feuerthalen, Switzerland

[21] Appl. No.: 785,718

[22] Filed: Oct. 9, 1985

[30] Foreign Application Priority Data

Oct. 9, 1984 [CH] Switzerland ............... 4839/84

[51] Int. Cl.$^4$ .............................................. G03B 11/00
[52] U.S. Cl. ................................................. 354/295
[58] Field of Search ................................. 354/295, 287

[56] References Cited

U.S. PATENT DOCUMENTS

| 3,701,582 | 10/1972 | Koch | 354/287 X |
| 4,053,910 | 10/1977 | Dodnar | 354/295 X |
| 4,327,984 | 5/1982 | Evans | 354/295 X |

FOREIGN PATENT DOCUMENTS 2074330A 10/1981 United Kingdom ............... 354/295

*Primary Examiner*—Donald A. Griffin
*Attorney, Agent, or Firm*—Watson, Cole, Grindle & Watson

[57] ABSTRACT

A coupling device for attaching frame-shaped accessories to photographic equipment which includes an annular rib (32) projecting in the axial direction with an annular collar projecting radially outwardly that continuously extends over 360° and has conical guide surfaces (33A, 33B) at one axial end surface of a first frame-shaped accessory (20, 60) to be coupled. Another accessory (60, 20) to be coupled has at one axial end surface several supports (65) projecting parallel to the axis which are somewhat elastically flexible in the radial direction, with claws (67) that are pointed radially inwardly. The supports (65) and the claws (67) of one accessory (60) are formed and attached in such a manner that the claws (67) can be connected to the annular collar (33) of the other accessory (20) in a coupling grasp and can be disconnected again from the annular collar (33), whereby the claws (67) glide over the conical guide surfaces (33A or 33B), the supports (65) being somewhat flexible and elastic. The accessories to be coupled are, e.g., a filter-supporting frame (20) and an end frame (60) of a bellows (61) to shield against undesired light rays.

6 Claims, 19 Drawing Figures

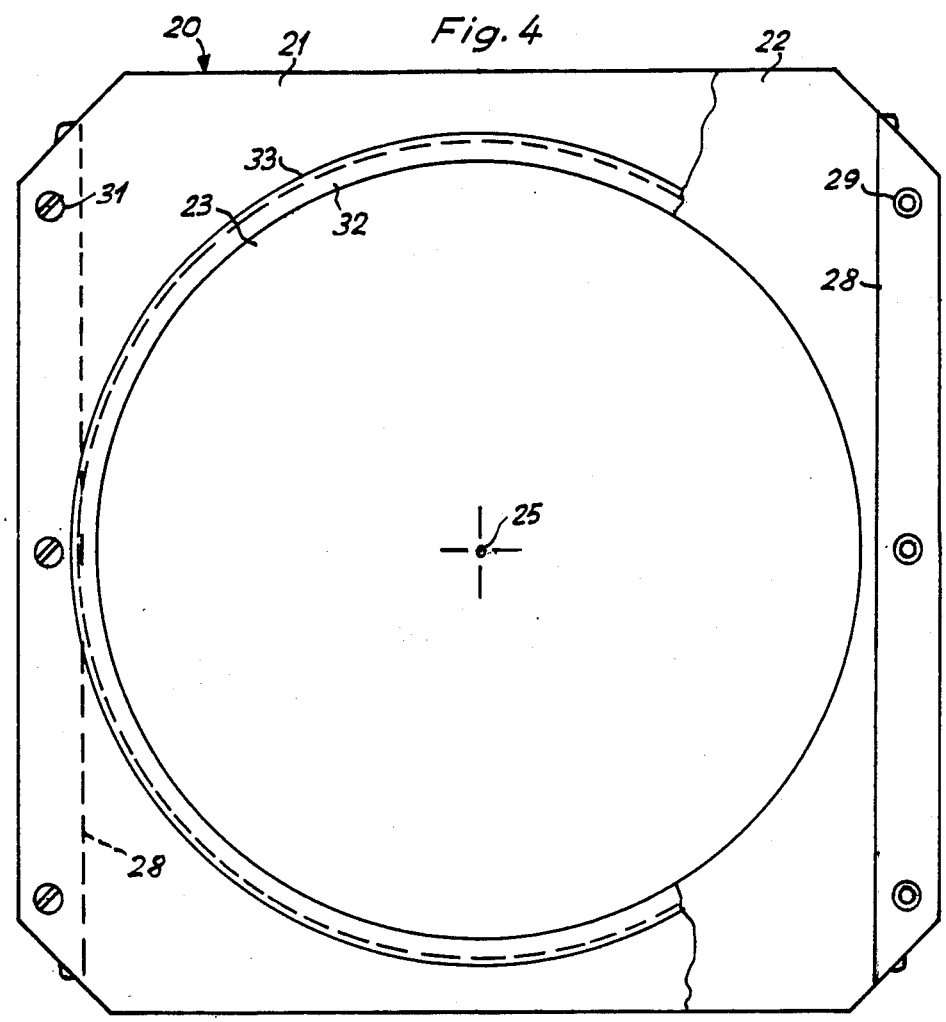
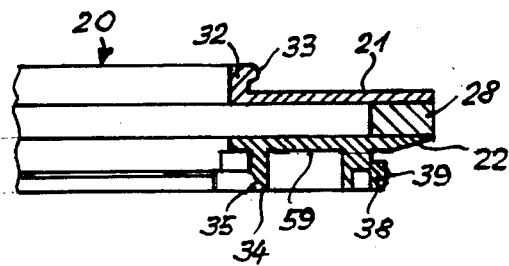

COUPLING DEVICE FOR FRAME-SHAPED ACCESSORIES FOR CAMERA EQUIPMENT

FIELD OF THE INVENTION

The present invention relates to coupling devices for frame-like accessories for photographic equipment, in particular cameras, which enable at least two such accessories to be coaxially connected and disconnected from each other. The present invention also relates to frame-like accessories which utilize such coupling devices.

Numerous versions of coupling devices that serve the same purpose are known in the art.

SUMMARY OF THE INVENTION

The principle object of the present invention is to provide a coupling device of the type mentioned above which will facilitate a quick and yet sure connection and disconnection of frame-like accessories that are about the same size and multiformity and are used with professional camera equipment, in particular professional photographic cameras. The term "frame-like accessories" is intended to include supporting frames for optic filters or masks, end frames of bellows which shield against undesired light rays, and intermediate pieces or adapters. The present invention also involves frame-like accessories for photographic equipment which include such coupling devices.

According to the invention the coupling device includes an annular, radially-directed collar on an axial end of a first frame-like accessory and at least three supports on an axial end of a second frame-like accessory, each of the supports extending in parallel with the axis of the second accessory and being elastically flexible in a radial direction, each support also including a claw, the claws of the supports on the second accessory being cooperable with the annular, radially-directed collar on the first accessory to connect the two accessories, the elastic flexibility of the supports enabling the two accessories to be easily coupled with and disconnected from one another.

The individual features and advantages of the invention will be better understood by reference to the accompanying drawings and the following description.

DESCRIPTION OF THE DRAWINGS

FIG. 3 represents a cross-sectional view taken along line 3—3 in FIG. 1;

FIG. 4 shows a view of the other axial end side of the filter-supporting: frame as shown in FIG. 1, part of the front plate being broken away;

DETAILED DESCRIPTION OF THE PREFERRED EMBODIMENTS

Figure 1:
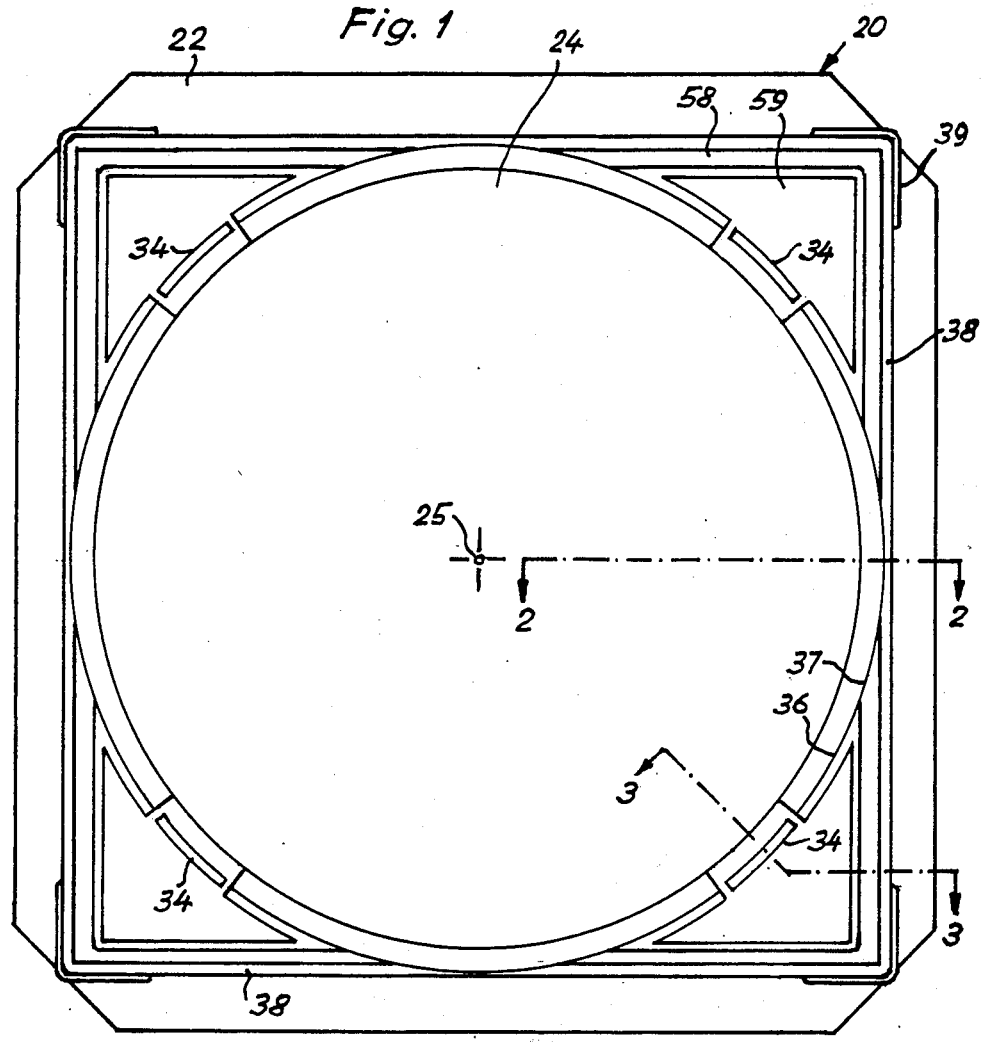
FIG. 1 shows a view of one of the axial end sides of a filter-supporting frame which includes a coupling device according to a first embodiment of the invention.

The filter-supporting frame 20 shown in FIGS. 1 to 4 includes two components 21 and 22 that are essentially shaped like plates, these components being designated in the following discussion as front piece 21 and back piece 22. The outer contour of both the front piece 21 and the back piece 22 has the shape of a square with its corners cut off. The front piece 21 is provided with a relatively large circular opening 23 (see FIG. 4) and the back piece 22 also has a similar opening 24 (see FIG. 1). Both openings 23 and 24 have the same diameter and a common geometric axis 25 that runs through the center of the front and back pieces 21 and 22 perpendicularly to their flat sides. The outer contours of the front and back pieces 21 and 22 also match and have the same orientation. The front piece 21 has a surface 26 which faces a surface 27 of the back piece 22. These surfaces 26 and 27 are spaced apart, and are not only arranged in register but are also parallel to one another. Between the front and back pieces 21 and 22 there are two strips 28, both of which run along one of the two parallel outer edges of the front and back pieces 21 and 22. The back piece 22 includes some conical projections 29, each of which mates in a matching drill hole 30 of one or another strip 28 and are provided with tapped holes in which a screw 31 extending through the matching edge piece of the front piece 21 is screwed in, as FIG. 2 clearly shows. The free space between both front and back pieces 21 and 22 and between both strips 28 serves to receive the optical filters or masks.

Figure 2:
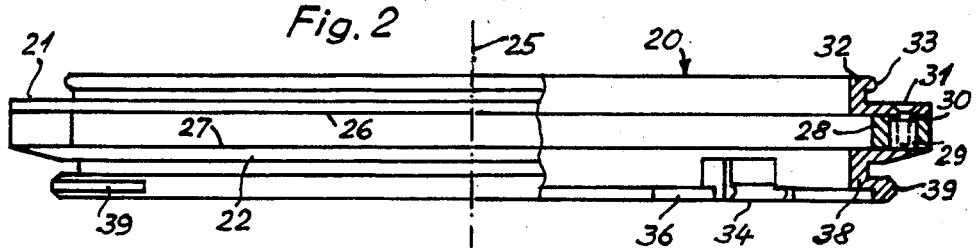
FIG. 2 shows a partially sectioned top view of FIG. 1, the partially sectioned part representing a cross sectional view taken along line 2—2 in FIG. 1.

The flat side of the front piece 21 that faces outwardly is provided, according to FIGS. 2 to 4, with a projecting annular rib 32 that runs along the circumference of the opening 23 and has an annular collar 33 projecting radially outwardly, i.e., away from the axis 25.

Figure 5:
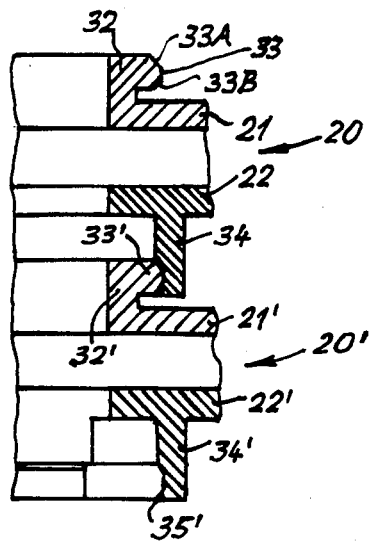
FIG. 5 illustrates, in an enlarged cross-sectional representation with respect to FIGS. 1 to 4, how the filter-supporting frame can be coupled to a corresponding second filter-supporting frame.

According to FIGS. 1 to 3, the flat side of the back piece 23 that faces outwardly has several attached supports 34 that are distributed along the circumference of the opening 24. Each of these supports projects in a direction parallel to the axis 25 and is somewhat elastically flexible in the radial direction. At its free end each of these supports 34 is provided with a claw 35 that points inwardly towards the axis 25. The supports 34 are dimensioned and arranged such that their claws 35 grasp and hold an annular collar 33' of an annular rib 32' of an identically built second filter-supporting frame 20' (FIG. 5). In order to guarantee that the opening 23' of the second filter-supporting frame 20' is perfectly centered with reference to the opening 24 of the filter-supporting frame 20, the flat side of the back piece 22 that faces outwardly is also provided with guide ribs 36 and guide steps 37 that run along the circular arc around the axis 25, within which the annular collar 33' of the second filter-supporting frame 20' fits with relatively little free radial space. It is clear from FIG. 5 that outer and inner conical guide surfaces 33A and 33B or 33A' and 33B' are formed at the annular collar 33 or 33'; they make it possible for the claws 35 of the supports 34 to automatically slide over the annular collar 33' by bending the elastic supports when axially connecting and disconnecting the two filter-supporting frames 20 and 20'. When the filter-supporting frames 20 and 20', according to FIG. 5, are coupled to one another, one of the filter-supporting frames can be rotated as desired with reference to the other frame around the common axis 25 because the annular collar 33 extends over 360° without a break. For example, such rotation is useful or necessary if effect or polarization filters or specific masks are inserted in one or both filter-supporting frames.

In the same manner a coupling rib 38 that runs along the side of a square is also formed on the flat side of the back piece 22 that faces outwardly; the coupling rib has a coupling collar 39 projecting outwardly in order to allow the filter-supporting frame 20 to be coupled to the standard frame described below. The coupling rib 38 encloses the opening 24; and the axis 25 of the opening 24 runs through the center of the square, along whose side the coupling rib 38 runs.

The standard frame mentioned above is shown in FIGS. 6 to 8 and is marked as 40. This standard frame 40 is known in the art as illustrated or in a similar embodiment. Therefore, it is sufficient to mention here only some of its constructional features. One major feature of the standard frame 40 are four frame pieces 41 to 44 that run in a straight line and that enclose a square opening 45. At the lower frame piece 41, shown in FIGS. 6 to 8, there is a connecting piece 46 that is shown in the diagram and with whose aid the standard frame 40 can be attached to one of the holders or articulated blocks that are not shown and which in turn is attached such that it is adjusted at an optical bench or some similar place. The optical bench can be, e.g., the basis of a universal or professional photographic camera that consists of interchangeable components in accordance with the module principle. There is a recess 47, adjoining the opening 45, at each flat side of the standard frame 40. In this recess the coupling rib 38 of the filter-supporting frame 20 that forms a square can, for example, be inserted such that it fits, as is clearly evident from FIG. 9. The lower frame piece 4 in FIGS. 6, 8 and 9 has a retaining plate 48 on each of both flat sides of the standard frame 40 that serves to grasp and hold the coupling collar 39 of the filter-supporting frame 20 to be coupled to the standard frame 40, as shown in the lower part of FIG. 9.

Figure 6:
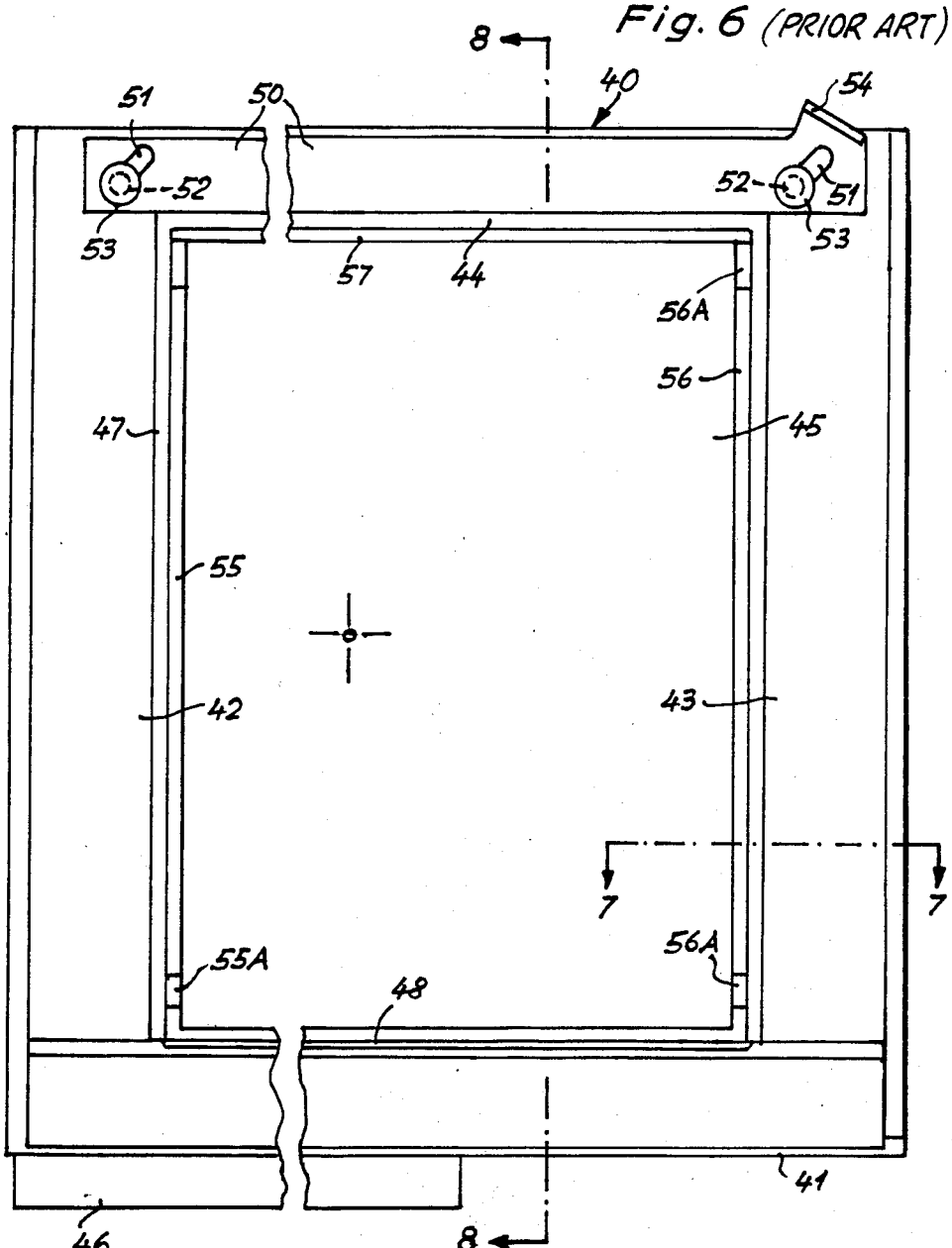
FIG. 6 a view of a standard frame for a professional photographic camera built according to the module principle.
Figure 7:
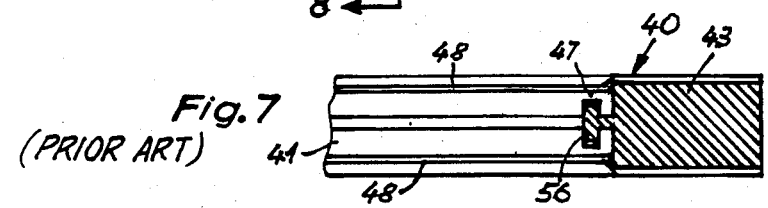
FIG. 7 represents a cross-sectional view taken along line 7—7 in FIG. 6.
Figure 8:
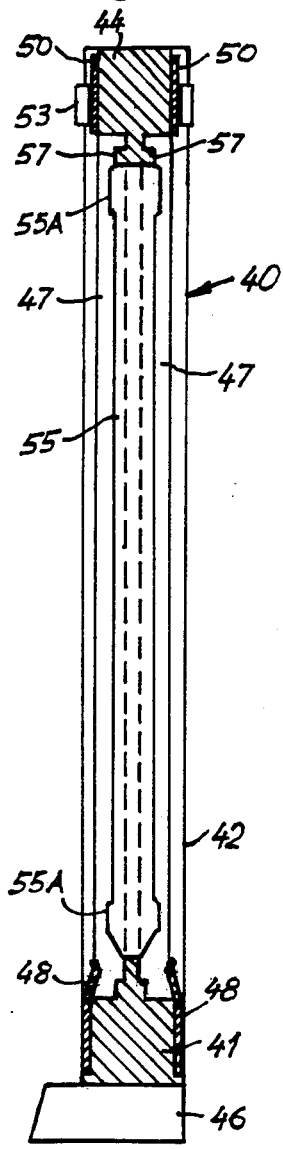
FIG. 8 a cross-sectional view taken along line 8—8 in FIG. 6.
Figure 9:
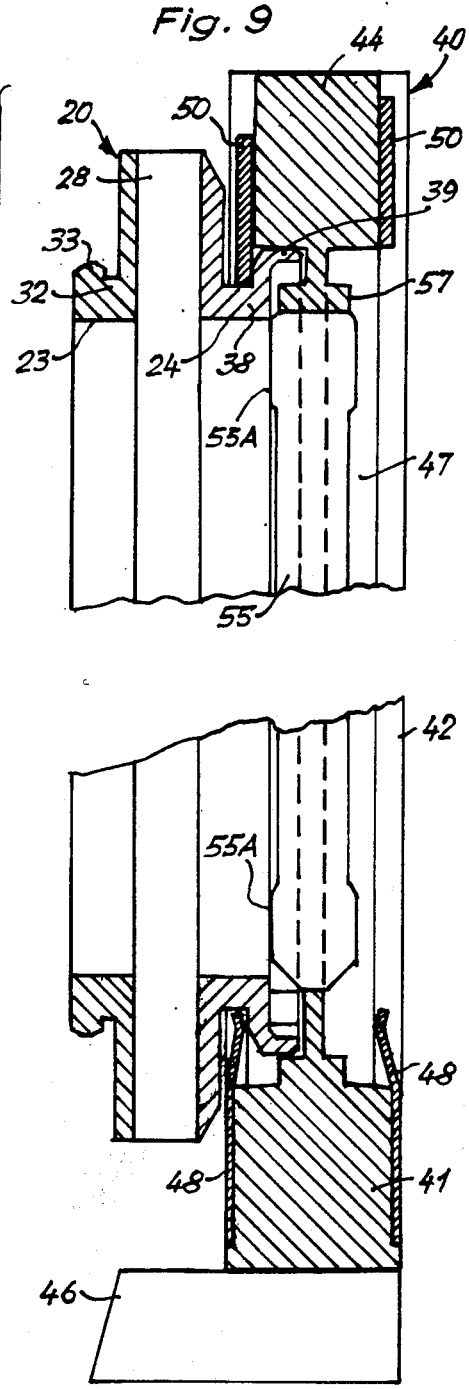
FIG. 9 illustrates, on an enlarged scale and in a cross-sectional representation analogous to FIG. 8, how the filter-supporting frame can be coupled according to FIGS. 1 to 4 to the standard frame shown in FIGS. 6 to 8.

The upper frame piece 44 in FIGS. 6, 8 and 9 is provided on each flat side of the standard frame 40 with a flexible bar 50 that has two oblique grooves 51, according to FIG. 6. With the aid of two bolts 52 with flat heads 53 and with grooves 51 each bar is guided and secured on the frame strip 44. Moreover, each bar 50 has a part 54 that is turned downward and serves as a lever to move the bar in and out of its functional position. The bars 50 in FIGS. 6 and 8 are shown out of their functional position. It makes it possible for the coupling rib 38 of the filter-supporting frame 20 that forms a square to be inserted into one of the recesses 47 of the standard frame 40. By moving the bar 50 into its functional position, the edge of the bar that faces the opening 45 grasps that part of the coupling rib 38, as shown in the upper part of FIG. 9. Thus the filter-supporting frame 20 is secured to standard frame 40. In order to disconnect the filter-supporting frame 20 from the standard frame 40, the bar 50 must be moved back into its non-functional position; then the coupling rib 38 that forms a square can be easily lifted out of the recess 47 of the standard frame and thus the filter-supporting frame 20 can be lifted off.

The vertical frame pieces 42 and 43 in FIGS. 6, 8 and 9 and also the upper frame piece 44 of the standard frame 40 have ribs 55, 56 or 57 running along the opening 45; the ribs project in the direction of the flat side of the standard frame and mesh in the recess 47. When the filter-supporting frame 20 is coupled to the standard frame 40, according to FIG. 9, the ribs 55, 56 and 57 mesh in the corresponding depression 58 (FIG. 1) within the coupling rib 38 that fits in a square of the filter-supporting frame. Supporting shoulders 55A and 56A are also formed at the vertical ribs 55 and 56; the flat supporting surfaces 59 (FIG. 1) of the back piece 22 of the filter-supporting frame that is coupled to the standard frame 40 rests on these supporting shoulders.

It is clear that a similarly constructed second filter-supporting frame 20' can be coupled to the filter-supporting frame 20 that is coupled to the standard frame 40 in the described manner, as illustrated in FIG. 5.

Figure 13:
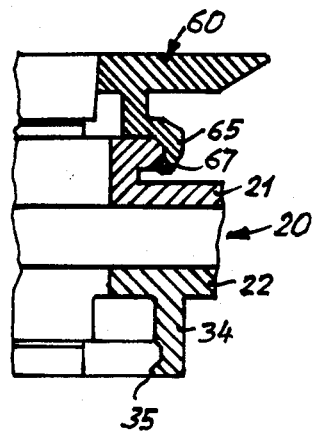
FIG. 13 is a cross-sectional representation analogous to FIG. 5 that shows how the filter-supporting frame shown in FIGS. 1 and 4 can be coupled to the end frame shown in FIGS. 10 amd 11.
Figure 12:
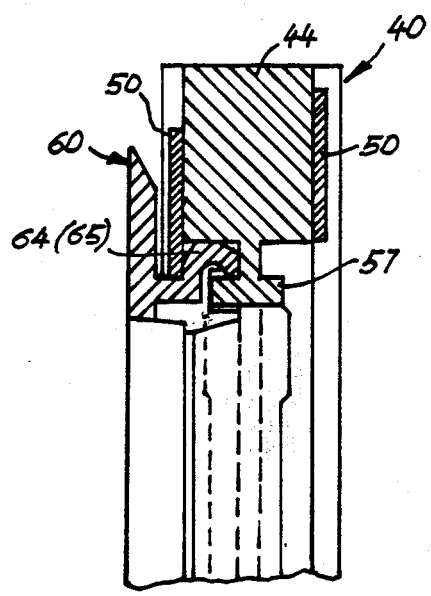
FIG. 12 cross-sectional representation analogous to FIG. 9 that shows how the end frame shown in FIGS. 10 and 11 can be coupled to the standard frame shown in FIGS. 6 to 8.
Figure 10:
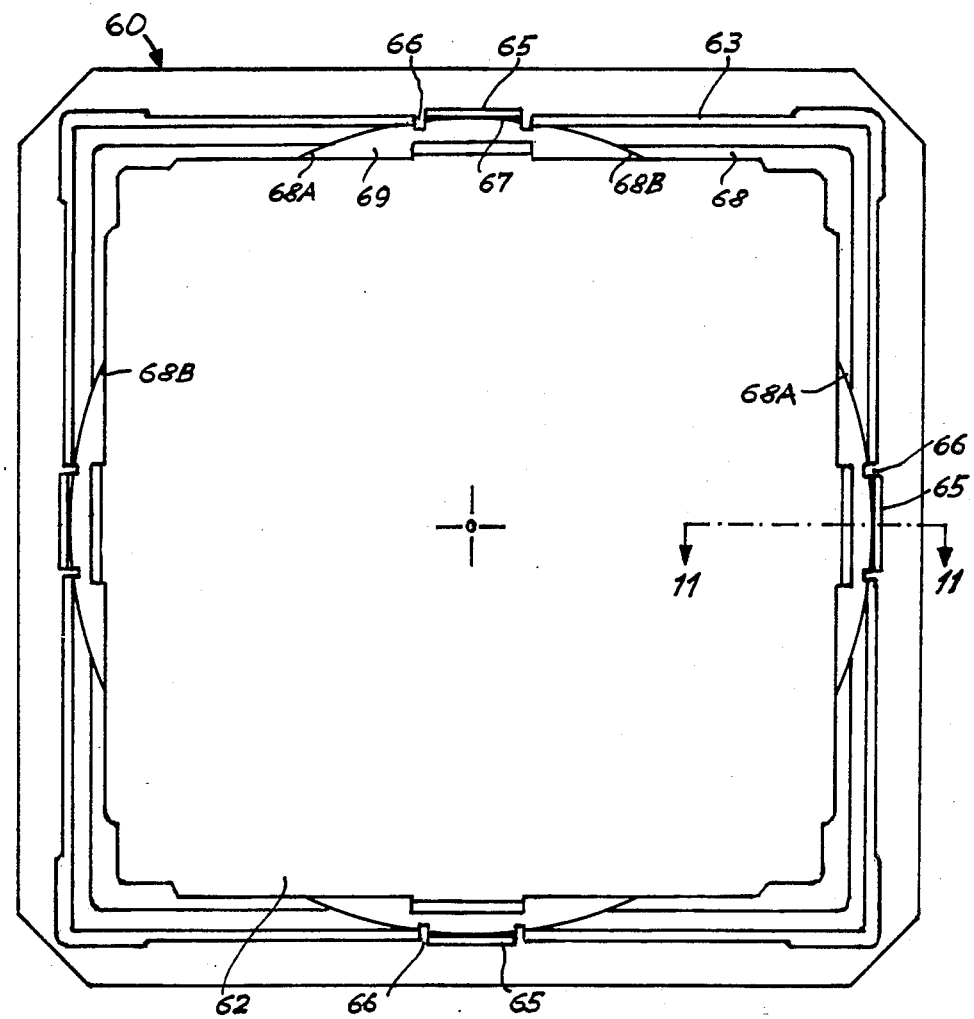
FIG. 10 shows a view of a flat side of a bellows end frame with a coupling device according to another embodiment of the invention.
Figure 11:
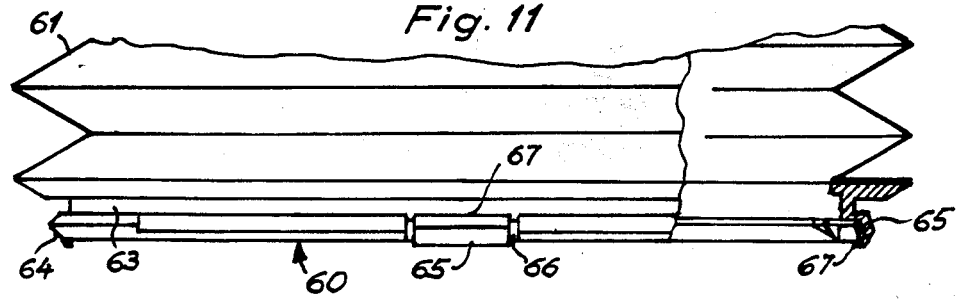
FIG. 11 shows a partially sectioned top view of a bellows with end frame as shown in FIG. 10, the partially sectioned part representing a cross-section of view taken along line 11—11 in FIG. 10.

FIGS. 10 and 11 show an end frame 60 of a fan bellows 61. According to FIG. 10, the outer contour of the end frame 60 has the shape of a square with its corners cut off. The end frame 60 encompasses an essentially square opening 62, whose width is for this purpose approximately the same size as the diameter of the openings 23 and 24 of the filter-supporting frame 20, described above. The flat side of the end frame 60 that faces the viewer in FIG. 10 shows a coupling rib 63 that runs along the sides of a square with a coupling collar 64 projecting outwardly. The shape and dimensions of the coupling rib 63 and its coupling collar 64 are essentially the same as for the coupling rib 38 and the coupling collar 39 of the filter-supporting frame 20, described above. Therefore, it is possible to couple the end frame 60 via the coupling rib 63 and the coupling collar 64, similarly to the filter-supporting frame 20, to the standard frame 40. This is shown in FIG. 12. Several elastically-flexible supports 65 are formed at the same flat side of the end frame 60 at which there is the coupling rib 63 that forms a square; these supports are attached at a break 66 in the coupling rib 63. Each of these supports 65 has an inwardly-pointing claw 67 at its free end and is somewhat flexible in the radial direction. The supports 65 and their claws 67 are attached and formed in such a manner that they are capable of grasping and holding the annular collar 33 of the filter-supporting frame 20. This makes it possible to couple the filter-supporting frame 20 to the end frame 60 together, as illustrated in FIG. 13, whereby the filter-supporting frame 20 can be rotated in its coupled state around the axis 25 with reference to the end frame 60.

Within the coupling rib 63 the end frame 60 has another rib 68 that runs parallel to the coupling rib 63 and is interrupted at times by circular depressions 69 in the region of the supports 65 in order to make it possible to place the annular collar 33 of the filter-supporting frames 20 to be coupled into the end frame 60. The ends 68A and 68B of the rib 68 at the transition points to the depressions 69 serve as guides to perfectly center the annular collar 33 when coupling the filter-supporting frame 20 to the end frame 60. The inner rib 68, however, also serves to improve the light seal when the end frame via its coupling rib 63 and its coupling collar 64 is coupled to the standard frame 40, as is evident in FIG. 12. The coupling rib 63 and the additional inner rib 68 form together with the ribs 55, 56 and 57 of the standard frame 40 a labyrinth seal that effectively prevents disturbing light from the outside from entering. The flat side of the described end frame 60 that is turned from the viewer in FIG. 10 is connected in some appropriate manner such that it is light sealed to one end of the bellows 61. Preferably a similarly constructed end frame is attached to the other (not illustrated) end of the bellows.

Figure 14:
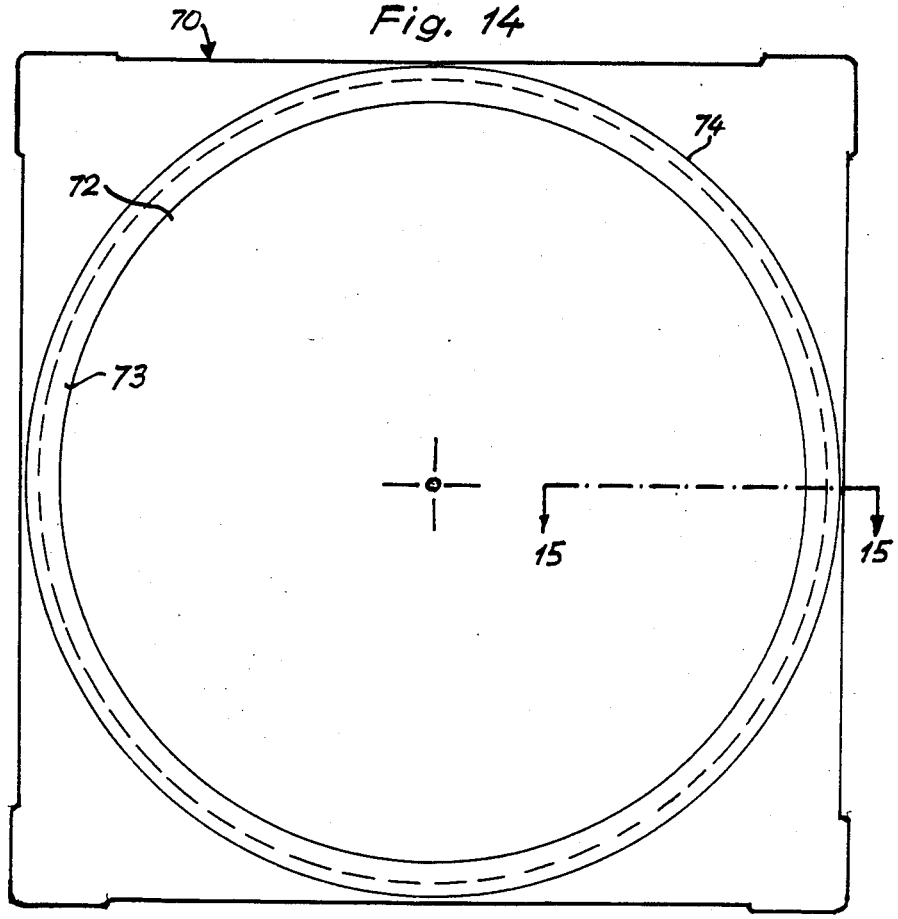
FIG. 14 represents a frontal view of an adapter that permits the filter-supporting frame, which according to FIGS. 1 to 4 can be rotated around its axis, to be coupled to the standard frame shown in FIGS. 6 to 8.
Figure 15:
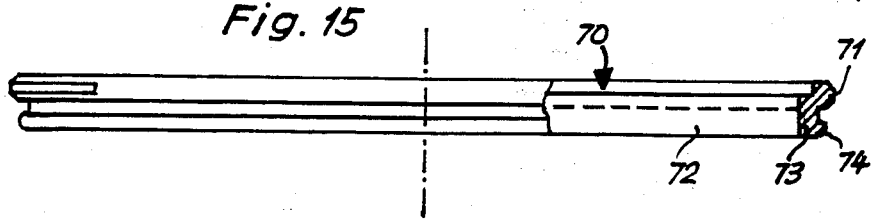
FIG. 15 is a partially sectioned top view of FIG. 14, the partially sectioned part representing a cross-sectional view taken along line 15—15 in FIG. 14.
Figure 16:
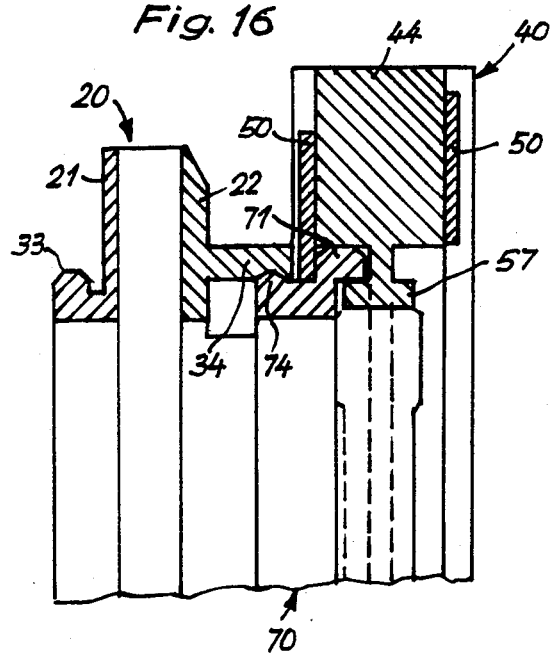
FIG. 16 shows, in an enlarged cross-sectional representation, how the adapter shown in FIGS. 14 and 15 can be coupled to the standard frame and the filter-supporting frame.

FIGS. 14 and 15 show an adapter 70 that is virtually shaped like a plate whose outer contour has the shape of a square. Along the outer edge of the adapter 70 runs a coupling collar 71 that matches essentially in shape and size the coupling collar 39 at the coupling rib 38 that fits in a square of the filter-supporting frame 20. Thus it is possible to couple the adapter 70 to the standard frame 40, as illustrated in FIG. 16. Moreover, the adapter 70 has a circular opening 72, whose diameter matches that of the openings 23 and 24 of the filter-supporting frame. An annular rib 73 with an annular collar 74 projecting radially towards the outside, runs along the circumference of the opening 72. This annular rib 73 and its annular collar 74 match in shape and size the annular rib 23 and the annular collar 32 of the filter-supporting frame 20. Thus it is possible to couple the filter-supporting frame 20 via its supports 34 to the annular collar 74 of the adapter 70 that is attached to the standard frame 40, whereby it is possible to rotate the filter-supporting frame 20 with reference to the adapter 70 and standard frame 40. The annular ribs 73 and its annular collar 74 of the adapter 70, however, also permit the end frame 60 of the bellows 65 to be coupled via the supports 65 to the adapter 70.

Figure 19:
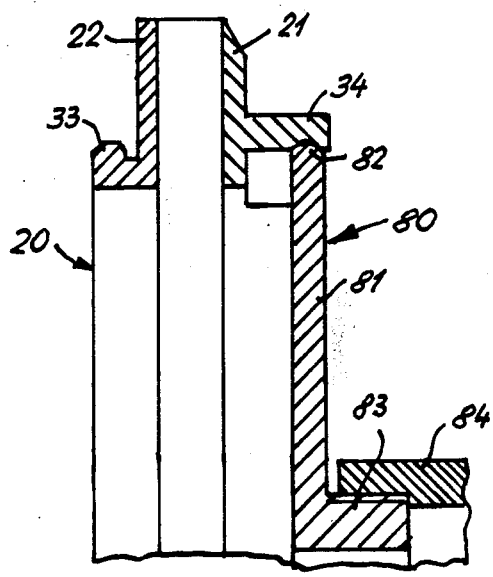
FIG. 19 illustrates, in an enlarged cross-sectional representation, how with the aid of the adapter shown in FIGS. 17 and 18, the filter-supporting frame can be coupled to the objective of camera equipment.
Figure 17:
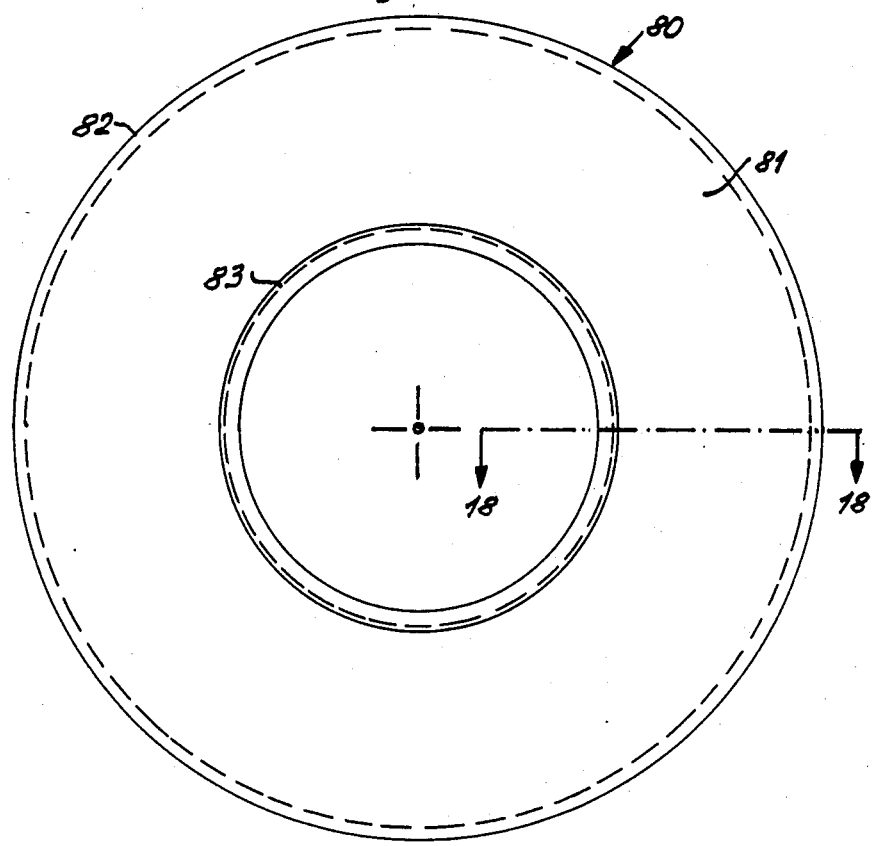
FIG. 17 is a frontal view of another adapter that permits the filter-supporting frame shown in FIGS. 1 to 4 to be coupled to the lens mounting of camera equipment.
Figure 18:
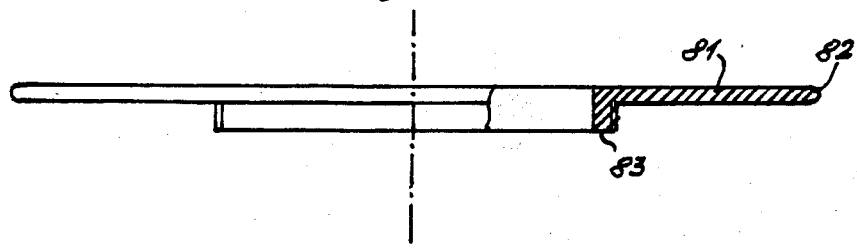
FIG. 18 is a partially sectioned top view of FIG. 17, the partially sectioned part representing a cross-sectional view taken along line 18—18 in FIG. 17.

A different adapter 80 is illustrated in FIGS. 17 and 18. This consists essentially of a rotationally symmetrical annular plate 81 at whose outer circumference an annular collar 82 is formed that in shape and size matches with the annular collar 33 of the filter-supporting frame 20 and thus can be coupled via the supports 34 of the filter-supporting frame 20 to the latter, as FIG. 19 shows. The inner circumference of the annular plate 81 is attached to an axially short, threaded connecting piece 83 that can be screwed together with the front thread of the mounting 84 (FIG. 19) of an optical image objective. With the aid of this adapter 80 it is thus possible to connect the filter-supporting frame 20 of the bellows end frame 60 to the lens mount. Instead of a threaded connecting piece 83, the adapter 80 can be provided, if necessary, with a clamping ring (not shown) or some such similar thing that can be attached to the lens mount.

The examples described show that the coupling device according to the invention can be applied to multiformed accessories for camera equipment, in particular photographic cameras, and can permit several accessories to be coupled and uncoupled in a number of ways and in sequential order. One major advantage of some of the embodiments is the fact that different accessories with various connecting geometry and/or connecting dimensions can be coupled to one another.

We claim:

1. A set of camera accessories comprising at least three frame-shaped accessories having coupling means for coaxially connecting and disconnecting said frame-shaped accessories, each frame-shaped accessory having opposite axial ends and defining an axis therethrough, said coupling means comprising an annular, radially-directed collar located at one axial end of a first of said at least three frame-shaped accessories, at least three supports located at one axial end of a second of said at least three accessories, each of said supports extending substantially in parallel with said axis of said second accessory and being elastically-flexible in a radial direction, each support also including a claw, said claws of said supports being cooperable with the annular, radially-directed collar of said first accessory to connect said two accessories, the elastic flexibility of said supports enabling said two accessories to be coupled with and disconnected from one another, said annular collar continuously extending in a 360° circular arc in order to permit a relative rotation of said two accessories when coupled to one another, a coupling rib projecting outwardly away from said axis located on at least one of said first and second frame-shaped accessories and running along sides of a square, a recess to accept said coupling rib located at least at one axial end of a third of said at least three frame-shaped accessories, and a locking means movably mounted on said third frame-shaped accessory, said locking means being movable in and out of an active position and, in its active position, engaging a portion of said coupling rib, when put into said recess, in order to non-rotatably secure together said third frame-shaped accessory and one of said first or second frame-shaped accessories having said coupling rib.

2. A set of camera accessories according to claim 1, wherein the elastically-flexible supports and the coupling rib running along sides of a square are arranged at the same axial end of the associated accessory.

3. A set of camera accessories according to claim 2, wherein said coupling rib running along sides of a square and said recess serving to accept it have surfaces that cooperate together like a labyrinth seal in order to guarantee a light-tight connection of the accessories.

4. A set of camera accessories according to claim 2, wherein the frame-shaped accessory having the elastically-flexible supports and the coupling rib running along sides of a square arranged at the same axial end thereof is an end frame of a bellows for shielding against undesired light rays.

5. A set of camera accessories according to claim 2, wherein the frame-shaped accessory having the elastically-flexible supports and the coupling rib running along sides of a square arranged at the same axial end thereof is a filter-supporting frame, the other axial end of which is provided with an annular, radially-directed collar that can be coupled with the elastically-flexible supports of another of said frame-shaped accessories.

6. A set of camera accessories according to claim 5, wherein said other frame-shaped accessory also is a filter-supporting frame identical to the first-mentioned filter-supporting frame.

* * * * *